United States Patent
Trofimenko et al.

(10) Patent No.: US 11,034,848 B2
(45) Date of Patent: Jun. 15, 2021

(54) PASTE-LIKE COMPOSITION AND METHOD FOR PRODUCING THREE-DIMENSIONAL STRUCTURES OR STRUCTURAL ELEMENTS ON SUBSTRATE SURFACES

(71) Applicant: FRAUNHOFER-GESELLSCHAFT ZUR FOERDERUNG DER ANGEWANDTEN FORSCHUNG E.V., Munich (DE)

(72) Inventors: Nikolai Trofimenko, Dresden (DE); Katrin Lucke, Dresden (DE); Mihails Kusnezoff, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/093,907

(22) PCT Filed: Mar. 30, 2017

(86) PCT No.: PCT/EP2017/057532
§ 371 (c)(1),
(2) Date: Oct. 15, 2018

(87) PCT Pub. No.: WO2017/178239
PCT Pub. Date: Oct. 19, 2017

(65) Prior Publication Data
US 2019/0085136 A1    Mar. 21, 2019

(30) Foreign Application Priority Data
Apr. 15, 2016 (DE) .............. 10 2016 206 345.6

(51) Int. Cl.
| | |
|---|---|
| C09D 7/63 | (2018.01) |
| C09D 5/00 | (2006.01) |
| C09D 17/00 | (2006.01) |
| B29C 64/153 | (2017.01) |
| C08J 3/09 | (2006.01) |
| C08J 3/20 | (2006.01) |
| C08K 3/22 | (2006.01) |
| C08K 5/01 | (2006.01) |
| B33Y 70/00 | (2020.01) |
| C08K 5/12 | (2006.01) |
| B29C 64/141 | (2017.01) |

(52) U.S. Cl.
CPC .............. *C09D 7/63* (2018.01); *B29C 64/153* (2017.08); *C08J 3/092* (2013.01); *C08J 3/095* (2013.01); *C08J 3/203* (2013.01); *C08K 3/22* (2013.01); *C08K 5/01* (2013.01); *C09D 5/00* (2013.01); *C09D 17/004* (2013.01); *B29C 64/141* (2017.08); *B33Y 70/00* (2014.12); *C08J 2301/08* (2013.01); *C08J 2333/12* (2013.01); *C08K 5/12* (2013.01)

(58) Field of Classification Search
None
See application file for complete search history.

(56) References Cited

U.S. PATENT DOCUMENTS

| | | |
|---|---|---|
| 2002/0195746 A1 | 12/2002 | Hull et al. |
| 2009/0008055 A1 | 1/2009 | Marutani et al. |
| 2014/0023957 A1* | 1/2014 | Brandner ................ B32B 18/00 429/509 |
| 2016/0004025 A1 | 1/2016 | Jost et al. |

FOREIGN PATENT DOCUMENTS

| | | |
|---|---|---|
| CN | 104031464 | 9/2014 |
| EP | 2774962 | 9/2014 |
| WO | 2010/000234 | 1/2010 |
| WO | 2012/110516 | 8/2012 |

OTHER PUBLICATIONS

Hu et al. Synthesis of 10 nm Ag nanoparticle polymer composite pastes for low temperature production of high conductivity films. Applied Surface Science, vol. 257, No. 3, Nov. 15, 2010, pp. 680-685.
Chinese Office Action.

* cited by examiner

*Primary Examiner* — Robert T Butcher
(74) *Attorney, Agent, or Firm* — Jacobson Holman PLLC

(57) ABSTRACT

A pasty composition for the manufacture of three-dimensional structures or structural elements on the surface of a substrate is formed together with a polymer as an organic component B1, and a powdery material that makes up a proportion of solid in the range of 60 mass % to 95 mass % in the composition, and
at least two mutually different solvents C1 and C2 that form a solvent mixture. A first solvent C1 has a boiling temperature here that is lower than the boiling temperature of the further solvent or solvents C2.

7 Claims, No Drawings

PASTE-LIKE COMPOSITION AND METHOD FOR PRODUCING THREE-DIMENSIONAL STRUCTURES OR STRUCTURAL ELEMENTS ON SUBSTRATE SURFACES

The invention relates to a pasty composition and to a method of manufacturing three-dimensional structures or structural elements on substrate surfaces that preferably comprise advantageous electrochemical and mechanical properties. Self-supporting functional layers or functional layers arranged on a substrate can in particular be manufactured using the pasty compositions, in particular for forming strip-like electrically conductive functional elements by applying the pasty compositions and a subsequent hardening of these compounds. The invention can advantageously be used in the manufacture of structures or structural elements at electrochemical cells or sensors. Adhesive or cohesive connections can also be manufactured using a pasty composition.

On the manufacture of various electronic or electric components, the application of functional layers takes place via physical or chemical vapor deposition. These techniques allow the manufacture of very fine and in particular thin structures. They are, however, not particularly suitable for inexpensive mass production. Different functional elements can be manufactured less expensively by silk screen printing, web-feed printing, or tampon printing. However, the disadvantage is present with these technologies that only limited aspect ratios of the printed structures can be achieved. Aspect ratio is understood as the ratio of the height of a structure, that is, the thickness of a structure, for example of a functional layer, to its width. The above-named printing processes have the general disadvantage that high layer thicknesses cannot be achieved, in particular with a small line width. This can e.g. lead to the following disadvantage that a sufficiently low electrical resistance can only be achieved by wider structures and/or by higher numbers of usable structures. On the implementation of narrow structures, the interaction between the printed composition that is used for the formation in a pasty consistency and the substrate also has to be taken into account. The paste and the substrate substantially influence the possible wide flowing of the applied structures. The printed structures here show a tendency to bleed with a narrow and high structural formation. The aspect ratio is thereby limited and the width of a structure or of a structural element is substantially greater than is directly the case on the formation of the structure or of a structural element.

With wider structures or structural elements, a different unwanted effect can frequently occur such as a collapse of the structure. The damp layer that is present directly on the formation with the pasty composition subsides in the center of the printed structure with the formation of a recess or of a valley so that the vertically upwardly directed surface of a structure or of a structural element is concavely arched and is optionally formed with individual trench-like recesses or craters. This produces an additional work effort such as in particular mechanical processing (e.g. grinding, milling) of printed and dried structures or even sintered structures. The suitable cutting machining processes are complex and/or expensive, however, since with already sintered structures the brittleness of the material and optionally a low adhesion of a structure that is formed on a substrate can result in damage up to a total failure, that is, to rejection. A correspondingly high time effort is at least required. With a cutting machining in the green state, it can likewise occur that a structure or a structural element is separated in an unwanted form in a non-defined manner from the respective substrate on which it has been formed.

To avoid such situations, the dried paste should have very good mechanical properties, which is, however, as a rule not achievable is or only achievable with a high effort and is associated with high costs.

It is therefore the object of the invention to provide possibilities to manufacture self-supporting three-dimensional structures or structural elements or three-dimensional structures or structural elements that are arranged on a substrate and that can preferably be formed as functional layers usable in electrochemical components and that are inexpensive and with which a large aspect ratio can be in particular be achieved in conjunction with a formation that is close to the final shape prior to a heat treatment in which a sintering of a solid contained in a pasty composition takes place.

This object is achieved using a pasty composition that has the features of claim 1. A method of manufacturing self-supporting three-dimensional structures or structural elements is defined by claim 9. Advantageous embodiments and further developments of the invention can be realized using features designated in subordinate claims.

The pasty composition is formed as a preferably heterogeneous mixture that is formed from a powdery solid A, an organic polymer B1, optionally from a plasticizer/softener/leveling agent/wetting additive and/or dispersion additive B2, and at least two solvents C1 and C2 for the organic components B1 and B2. One of the solvents C1 here has a boiling temperature at which an evaporation of the first solvent C1 takes place and which is lower than the boiling temperature of a further solvent C2. The boiling temperature of the first solvent C1 is advantageously at least 10 K lower than the boiling temperature of a further solvent C2.

The pasty composition can particularly advantageously be brought into the desired geometrical shape, in particular layer-wise, using a generative manufacturing process and can be solidified in this shape preferably by evaporating the first solvent C1 directly after the formation of a layer with which a structure or a structural element is formed. The formation of the structure or structural elements can be achieved with a single layer, in particular by means of template printing, or also by a plurality of individual layers formed above one another using, for example, different printing processes, with the process of evaporation of the first solvent C1 taking place directly after the formation of a layer for each individual layer. The at least one further solvent C2 is only evaporated later in a heat treatment that produces a complete drying and at which a higher temperature is observed that is above the boiling temperature of the further solvent(s) C2 and naturally also above the boiling temperature of the first solvent C1. No more solvent should be contained in the dried structure or in a structural element after this heat treatment.

A pasty composition can be realized with a powdery solid on the basis of electrically conductive oxides, mixed oxides, spinels, perovskites, metals, or their mixtures in particle form with particle sizes in the range between 0.1 µm and 10 µm. The multi-component organic solvent mixture is formed with different solvents C1 and C2. At least one solvent C1 should be selected from the group with which an RER (relative evaporation rate) value above 1 can be observed. The value for the term RER (relative evaporation rate) is parameter for the comparison of the evaporation of a solvent with a standard sample (normally n-butyl acetate). A solvent having an RER value above 1 presents a solvent with a high evaporation rate. Generally, the expression "solvent with a high evaporation rate" or "volatile solvents" should here mean that a solvent C1 contained in the solvent mixture is able to at least almost completely evaporate from the pasty composition during a known drying process after the formation of at least one layer by means of a printing process.

However, at least one further solvent C2 that was contained in the solvent mixture remains in the pasty composition after the formation of a layer, whereby the viscosity of the pasty composition is only reduced and a plastic deformation of the pasty composition is, however, still possible by an additional application of force and/or a simplified mechanical material removal is still possible. A plastic deformation that occurs solely by the effect of gravity, however, no longer takes place after the evaporation of the first solvent C1 so that no further deformation of the structure or structural element formed by printing one or more layers occurs without an additional machining except for a shrinkage that occurs during sintering.

It is in particular favorable for a formation of functional layers having narrow structures or structural elements, in particular with a height to width ratio (aspect ratio) of a>0.3 to carry out a drying process at room temperatures, that is, below 30°. The drying in which a first solvent C1 completely evaporated should take place in as short a time as possible and this time should be able to be kept shorter than 0.5 h, preferably shorter than 20 min, and particularly preferably shorter than 5 min. In this case, the wide flowing of the pasty composition can be suppressed in that a fast hardening or hardening start is made possible at least at the surface or in a region close to the surface by evaporating the first solvent C1 at a high evaporation rate after the application of the pasty composition so that the applied pasty composition becomes stable in shape in a short time. This shape stability can in particular be realized by forming a mechanically stable skin.

The viscosity should in every case be reduced by the evaporation of the first solvent C1 so that, where necessary, a plastic deformability is still present or a simplified machining by material removal at the surface of a not yet sintered structure or structural element is possible using the solvent (s) C2 still remaining in the pasty composition.

Particularly suitable examples for first solvents C1, preferably having an RER value above 1, are hexane, cyclohexane, methyl acetate, ethyl acetate, benzene, methyl ethyl ketone, isopropanol, ethanol, and methanol.

A further solvent C2 having an RER (relative evaporation rate) value of less than 1 cannot disadvantageously influence the solubility of the polymer B1 and of other organic additives such as plasticizers/softeners/leveling agents/wetting and dispersion additives B2. On the other hand, these further solvents C2 can influence the long-term stability of the pasty composition and their thixotropic properties. The thixotropic properties can thus have an advantageous effect on the formation of the ultimately desired outer contour of a structure or structural element if in particular a plastic deformability or a material removal should take place at a not yet sintered structure or structural element. A plastic deformation can thus be achieved by a shaping tool acting on a not yet sintered plastically deformable structure or structural element. A material removal can be achieved by a cutting machining, in particular by means of grinding or milling. Much lower forces and torques act here than would be the case with a cutting machining after sintering so that a peeling of structures or structural elements from a substrate surface and/or damage to a structure or structural element due to an unwanted material removal can be avoided.

Butyl carbitol, monoethylene glycol, diethylene glycol, 1,2-propanediol, butanol, 3-methoxy-1-butanol, terpene oil, or pine oil can be used as a further solvent C2. These chemical compounds can each be included on their own, but also in a combination of at least two of these chemical compounds, in a solvent mixture with a first solvent C1.

The respectively used amount of the solvent mixture can be selected within wide limits in the range from 3 mass % to 40 mass % in dependence on the other variable components that form the pasty composition and on the desired results or properties. For most applications, the respectively used organic solvent mixtures having 5 mass % to 95 mass % of a first solvent 1, and having an RER value greater than 1 and of a at least one further organic solvent C2 having a content in the range from 5 mass % to 95 mass % that has an RER value smaller than 1 can be used.

An organic polymer B1 and optionally at least one plasticizer/softener/leveling agent/wetting and dispersion additive B2 are dissolved in the solvent mixture. The plasticizer/softener/leveling agent/wetting and dispersion additive B2 can be utilized for a better strength of a structure or structural element after the application and drying of the pasty composition. The following organic polymers B1 can be used that have in particular been found to be suitable for a formation of structures or structural elements using a printing process: Ethyl cellulose of the type N-4 to N-300, methyl methacrylate, n-Butyl methacrylate, acrylic polymers or alkyd resins. The pasty composition can be composed of one or more further organic components such as plasticizers/softeners/leveling agents/wetting and dispersion additives B2. The following components can in particular be contained as B2: 1,2,3,4-tetrahydronaphthalene, dimethyl cyclohexyl phthalate, naphthalene, N-oleoylsarcosine, 1,2-cyclohexane dicarboxylic acid diisononylester, trihydroxystearin, octadecylamind, triethanolamine, oleic acid and/or stearic acid. The contained amount of the further organic component(s) B2 can be selected in the range from 0.05 mass % to 6.0 mass % in dependence on the other variables of the system and the desired properties of the pasty composition.

The material for the solid can be any desired powder. The material can act as an electric resistor, an electric conductive track, or an electric insulator. A contact system can particularly preferably be formed in which electrically conductive oxides, mixed oxides, spinels, perovskites, metals, or glasses, or their mixtures are used.

The solid content of the pasty composition, i.e. the functionally effective phase in the pasty composition, should be maintained in the region between 60 mass % to 95 mass %, preferably 65 mass % to 85 mass %. A mean particle size $d_{50}$ should be observed in the range 0.1 µm to 10 µm, preferably between 0.5 µm and 5 µm.

A flowing of the printed structures or structural elements after the application to the substrate can be suppressed by the use of a pasty composition in accordance with the invention. In addition, an improved adhesion on the substrate can be achieved, with optionally a volume reduction (contraction) of the applied structure or structural element being able to be made possible without a loss of adhesion.

The pasty composition can have thixotropic properties with which the risk of breakage can be reduced as a consequence of the viscosity on the action of shear forces and the strength and shape stability, however, increases greatly in the unloaded state. Due to these properties, a certain viscosity of the pasty composition before and after a printing should be observed for the achieving and maintaining of a correspondingly large aspect ratio. Accordingly, a pasty composition should have a viscosity at a temperature in the range of 20° C. to 30° C. in the range from 40 Pas to 300 Pas with a shear rate η of 10 s$^{-1}$. At a shear rate η of 100 s$^{-1}$, a viscosity of 10 Pas to 35 Pas should be observed.

To suppress the unwanted problems that often occur (such as wide flowing of a printed strip, of a column, or of a dot), a viscosity increase should take place within the first 10 minutes in the range 60 Pas to 450 Pas (measurement value with respect to a shear rate η of 10 s$^{-1}$) to harden the surface of a structure or of a structural element after the application/printing. The respective viscosity increase can be influenced by means of the composition of the pasty composition and by the drying.

A structural element, for example also in the form of a web or of a column, can be formed on a substrate with a pasty composition in accordance with the invention. The entire surface can also preferably be printed by means of silk screen printing, template printing, tampon printing, 3D printing, or dispensing. The printing can take place in one layer form or in multi-layer form. A plurality of layers can be formed after one another and above one another, with a drying taking place after the formation of every single layer in which at least the larger portion of the first solvent C1 should be evaporated.

The invention will be explained with reference to examples in the following.

EXAMPLE 1

Preparation of a Pasty Composition for Manufacturing a Web-like Contact Layer Between an Interconnector and a Cathode of a High Temperature Fuel Cell 50 g 1,2,3,4-tetrahydronaphthalene as B2, 5 g benzyl alkyl phthalate as B2, 3 g butyl glycolate as C2, 0.5 g naphthalene as B2, 36.5 g terpene oil as a further solvent C2, 2 g ethyl cellulose of the type N-7 as B1, and 6 g ethyl acetate as C1 are mixed and heated in a closed agitator vessel. An organic mixture is obtained that is pourable at room temperature and that could be stored without any greater change of its flow properties. 80 g perovskite powder (e.g. $La_{0.8}Sr_{0.2}Mn_{0.9}Co_{0.1}O_3$) having a mean particle diameter $d_{50}$ of 5 μm are pasted into 20 g of the above-named organic mixture with the aid of an agitator, dissolver, mortar mill, or speed mixer. The obtained pasty composition is subsequently homogenized in a triple roller mechanism (roller mill). The prepared paste is applied to a surface of an interconnector as a substrate by means of silk screen printing or template printing or by means of a dispenser. After drying in which C1 as the first solvent has at least been completely evaporated at 25-75° C., the structure formed with the pasty composition on the cathode surface can be mechanically treated at its surface and in so doing the surface can preferably be smoothed and leveled before a heat treatment leading to sintering is carried out.

EXAMPLE 2

On the preparation of a pasty composition for a contact layer formed with webs between an interconnector and a cathode of the high temperature fuel cell, 15 g methyl methacrylate and/or n-butyl-methacrylate as an organic polymer B1, 80 g terpene oil as a further solvent C2, 2 g butyl carbitol as a further solvent C2, and 5 g isopropanol as a solvent C1 are mixed and heated in a closed agitator vessel. An organic mixture is obtained that is pourable at room temperature and that could be stored without any greater change of its flow properties. 80 g perovskite powder (e.g. $La_{0.8}Sr_{0.2}Mn_{0.9}Co_{0.1}O_3$) having a mean particle size $d_{50}$ of 5 μm and 1 g, 2,4,7,9-tetramethyl-5-decyne-4,7-diol as B2 are pasted into 20 g of this organic mixture with the aid of an agitator mechanism, a dissolver, a mortar mill, or a speed mixer. The pasty composition is subsequently homogenized with the aid of a roller mill. The prepared paste is applied to a surface of the interconnector as a substrate by means of silk screen printing or template printing or by means of a dispenser. After drying, in which at least the first solvent C1 has been almost completely evaporated, it can be processed by plastic deformation mechanically or in a shaping manner by means of a shaping tool that can be placed on before a heat treatment leading to sintering is carried out.

The three-dimensional web structure obtained in accordance with Examples 1 or 2 has a structural width of 3 mm and a layer thickness of the web lines in the range between 200 μm and 550 μm, preferably 300 μm to 350 μm. To realize these structures, a pasty composition in accordance with the invention was used whose viscosity was initially at approximately 60 Pas and whose viscosity value increases to 110 Pas after drying at air for 10 min.

The invention claimed is:

1. A method of manufacturing three-dimensional structures or structural elements in which a pasty composition is printed in the form of at least one layer onto the surface of a substrate and a temperature increase is observed in this process at which a first solvent C1 evaporates but a further solvent C2 does not evaporate so that the viscosity of the pasty composition is increased, and subsequently a mechanical processing or plastic deformation is carried out in which a predefined outer contour of the respective structure or of a respective structural element is achieved and subsequently a thermal treatment is carried out in which all organic components including the further solvent C2 are removed and a powdery material is sintered, wherein the pasty composition comprises a polymer as the organic component B1, and the powdery material that makes up a proportion of solid in the range of 60 mass % to 95 mass % in the composition, and at least two mutually different solvents C1 and C2 that form a solvent mixture, wherein the first solvent C1 has a boiling temperature that is lower than the boiling temperature of the further solvent C2;

wherein the first solvent C1 is selected from hexane, cyclohexane, methyl acetate, ethyl acetate, benzene, methyl ethyl ketone, isopropanol, ethanol, and methanol; and the further solvent C2 is selected from butyl carbitol, monoethylene glycol, diethylene glycol, 1,2-propanediol, butanol, 3-methoxy-1-butanol, terpene oil, or pine oil; and the organic polymer B1 is selected from ethyl cellulose of the type N-4 to N-300, methyl methacrylates, n-butyl methacrylates, acrylic polymers or alkyd resins; and wherein the pasty composition comprises one or more further organic components B2 selected from the group consisting of 1,2,3,4-tetrahydronaphthalene, dimethyl cyclohexyl phthalate, naphthalene, N-oleoylsarcosine, 1,2-cyclohexane dicarboxylic acid diisononylester, 2,4,7,9-tetramethyl-5-decyne-4,7-diol, trihydroxystearin, octadecylamine, triethanolamine, oleic acid and stearic acid.

2. The method in accordance with claim 1, characterized in that the printing takes place by means of silk screen printing, template printing, tampon printing, or dispensing with a respective layer thickness of at least 100 μm; and/or in that a height to width ratio α in the range $0.05 \leq a \leq 1.0$ is observed.

3. The method in accordance with claim 1, characterized in that, at a temperature in the range from 20° C. to 30° C., a viscosity in the range from 40 Pas to 300 Pas is observed with a shear rate γ of 10 s$^{-1}$ and a viscosity in the range from 10 Pas to 35 Pas is observed with a shear rate γ of 100 s$^{-1}$.

4. The method in accordance with claim 1, characterized in that the first solvent and the at least one further solvent, C1 and C2, are contained with a proportion in the range 3 mass % to 40.0 mass %.

5. The method in accordance with claim 1, characterized in that 0.05 mass % to 6.0 mass % of plasticizer, softener, leveling agent, wetting additive or dispersion additive B2 and 0.05 mass % to 8.0 mass % of organic polymers B1 are contained in the composition.

6. The method in accordance with claim 1, characterized in that an oxide, a mixed oxide, a spinel, a perovskite, a metal and/or a glass or a mixture thereof is contained as the powdery material.

7. The method in accordance with claim 1, characterized in that the powdery material having a mean particle size $d_{50}$ in the range between 0.1 μm and 10 μm is contained.

* * * * *